3,084,152
MONOAZO DYES CONTAINING A CYANURIC CHLORIDE SUBSTITUENT

Herbert Francis Andrew, Manchester, England, assignor to Imperial Chemical Industries Limited, London, England, a corporation of Great Britain
No Drawing. Filed Feb. 10, 1958, Ser. No. 714,059
Claims priority, application Great Britain Feb. 25, 1957
5 Claims. (Cl. 260—153)

This invention relates to new azo dyestuffs and more particularly it relates to new azo dyestuffs especially valuable for the production of shades having exceptionally high fastness to washing.

According to the invention there are provided, as new dyestuffs, the compounds which, in the free acid form, are represented by the formula:

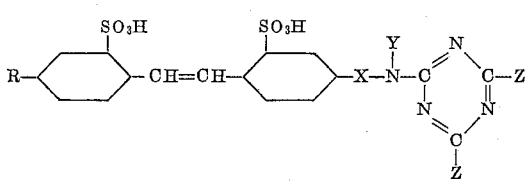

Formula I wherein R stands for a halogen atom, a nitro group, a substituted amino group other than monoalkylamino, an acylamino group, a 1':2':4:5-naphthatriazolyl group, which may be substituted by sulphonic acid, a 4-arylazo-3-substituted-pyrazol-5-on-1-yl group, wherein the arylazo may be substituted other than with amino, monoalkylamino or a metallisable system, or a group of the formula —N=N—B where B is the radical of a coupling component, X stands for a direct link or for a divalent arylazo group which may be substituted otherwise than with amino, monoalkylamino or a metallisable system, Y stands for a hydrogen atom or for an alkyl group and Z stands for a halogen atom, provided that one at least of the groups represented by R and X contains at least one azo group.

As examples of halogen atoms represented by R and Z there may be mentioned chlorine and bromine, and as examples of alkyl groups represented by Y, there may be mentioned methyl, ethyl, butyl, hexyl and octyl.

As examples of substituted amino groups represented by R there may be mentioned arylamino, such as anilino and p-nitroanilino, di-aralkylamino such as dibenzylamino, and dialkylamino such as dimethylamino.

As examples of acylamino groups represented by R there may be mentioned acetylamino and benzoylamino.

As examples of substituents which may be present in the 3-position of the 4-arylazo-3-substituted-pyrazol-5-on-1-yl group represented by R, there may be mentioned alkyl such as methyl, aryl such as phenyl, carbalkoxy such as carbomethoxy and carboxylic acid groups.

As examples of substituents which may be present in any arylazo group which wholly or in part forms a group represented by R or X, there may be mentioned halogen such as chloro, nitro, sulphonic acid and carboxylic acid groups, alkyl such as methyl, alkoxy such as methoxy and ethoxy, hydroxy, acylamino such as acetylamino and benzoylamino, dialkylamino such as dimethylamino and diethylamino, diaralkylamino such as dibenzylamino or substituted dibenzylamino, arylamino such as anilino or substituted anilino, and arylazo groups, in which last case it will be seen that R and/or X as the case may be contains the residue of a polyazo compound.

According to a further feature of the invention there is provided a process for the manufacture of new azo dyestuffs which comprises interacting substantially equimolecular proportions of a cyanuric halide and an aminoazo compound which, in its free acid form is represented by the formula:

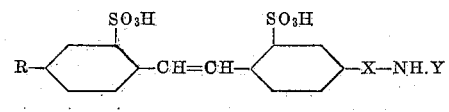

Formula II wherein R, X and Y have the meanings given above.

By substantially equimolecular proportions is meant such relative proportions that there is at most 20% by weight of either reactant in excess of that which represents a quantity molecularly equivalent to the quantity used of the other reactant. Suitable cyanuric halides include, for example, cyanuric chloride and cyanuric bromide.

Suitable aminoazo compounds of the above formula may be obtained, according to the position of the azo group or groups relative to the stilbene residue, by a number of methods. Thus a compound where X represents an arylazo residue may be obtained from a 4-aminostilbene-2:2'-disulphonic acid, substituted in the 4'-position by a group represented by R, for example, 4'-nitro-4-aminostilbene-2:2'-disulphonic acid, 4'-(5-sulpho-2-naphtha-(1':2':4:5)triazolyl) - 4 - aminostilbene-2:2'-disulphonic acid, 4'-acetylamino-4-aminostilbene-2:2'-disulphonic acid, 4'-benzoylamino-4-aminostilbene-2:2'-disulphonic acid, 4'-chloro-4-aminostilbene-2:2'-disulphonic acid, 4'-bromo-4-aminostilbene-2:2'-disulphonic acid, 4'-dimethylamino-4-aminostilbene-2:2'-disulphonic acid, 4'-anilino-4-aminostilbene-2:2'-disulphonic acid, or 4'-dibenzylamino-4-aminostilbene-2:2'-disulphonic acid, by diazotising and coupling the diazonium compound so obtained with an arylamine or an alkylarylamine, for example aniline (as its ω-methanesulphonate), m-toluidine, 2-methoxy-5-methylaniline, 1-naphthylamine - 6 - sulphonic acid, o-anisidine, 2:5-dimethoxyaniline, m-anisidine, 1-naphthylamine-7-sulphonic acid, α-naphthylamine, monomethylaniline, monoethylaniline, monobutylaniline and anthranilic acid (as its ω-methane sulphonate).

A particularly valuable series of compounds used as starting materials may be obtained in this manner using a primary aromatic amine of the benzene series as coupling component, the products obtained being of the type represented by 4 - substituted-4'-(4''-aminophenylazo)-stilbene-2:2'-disulphonic acid, the other members of the series containing substituents in the benzene ring of the aminophenylazo group. An alternative process for the manufacture of this valuable series of compounds comprises treating the appropriate 4-substituted-4'-nitrostilbene-2:2'-disulphonic acid, for example 4:4'-dinitrostilbene-2:2'-disulphonic acid, with a p-phenylene diamine in the presence of alkali. Suitable p-phenylene diamines include, for example 1:4-phenylene diamine-2-sulphonic acid, 2 - methyl - 1:4-phenylene diamine, 2-methoxy-1:4-phenylene diamine and, preferably, p-phenylene diamine itself.

Compounds where X represents a polyazo compound may be obtained from such an aminoazo compound where X represents an arylazo grouping containing an unsubstituted amino group by diazotising and coupling the diazonium compound obtained with an arylamine or an alkylarylamine of the kind exemplified above.

Those compounds used in the above process wherein X of the formula stands for a direct link contain at least one azo group in the group represented by R. Where an azo group is attached directly to the stilbene residue, suitable compounds may be obtained, for example, by coupling diazotised 4 - nitro-4'-aminostilbene-2:2'-disulphonic acid with a coupling component and reducing the nitro group of the compound so obtained to amino.

Where the coupling component used contains an unsubstituted amino group attached to an aromatic nucleus, the product obtained may itself be diazotised and coupled with a coupling component, before reducing the nitro group. By this means a polyazo residue may be formed in the group represented by R. It is to be understood that where an amino or monoalkylamino group is introduced with the coupling component into the molecule, the group so introduced is converted for example by acylation, into a group which will not react with the cyanuric halide, before the nitro group is reduced.

A wide variety of coupling components may be used in this manner, for example there may be used phenols, naphthols, pyrazolones, β-ketoacetoarylides, arylamines, acylaminonaphthols and sulphonic acids derived therefrom.

As specific examples of coupling components which may be so used there may be mentioned phenol, α-naphthol, β-napthol, 1-naphthol-4-sulphonic acid,
1-naphthol-5-sulphonic acid,
2-naphthol-1-sulphonic acid,
2-naphthol-6-sulphonic acid,
2-naphthol-7-sulphonic acid,
2-naphthol-3:6-disulphonic acid,
1-naphthol-3:6-disulphonic acid,
1-naphthol-3:8-disulphonic acid,
1-naphthol-3:6:8-trisulphonic acid,
3-methyl-5-pyrazolone,
1-phenyl-3-methyl-5-pyrazolone,
1-(2':5'-dichloro-4'-sulphophenyl)-3-methyl-5-pyrazolone,
1-(2'-chloro-4'-sulphophenyl)-3-methyl-5-pyrazolone,
1-(2'-chloro-5'-sulphophenyl)-3-methyl-5-pyrazolone,
1-(3'-sulphophenyl)-3-methyl-5-pyrazolone,
1-(4'-sulphophenyl)-3-methyl-5-pyrazolone,
1-(2'-sulphophenyl)-3-methyl-5-pyrazolone,
1-(4'-chlorophenyl)-3-methyl-5-pyrazolone,
1-(2'-chlorophenyl)-3-methyl-5-pyrazolone,
1-(2':5'-dichlorophenyl)-3-methyl-5-pyrazolone,
1-(2'-chloro-6'-methylphenyl)-3-methyl-5-pyrazolone,
1-(2'-methylphenyl)-3-methyl-5-pyrazolone,
1-(3'-chloro-6'-carboxyphenyl)-3-methyl-5-pyrazolone,
1-(3'-carboxyphenyl)-3-methyl-5-pyrazolone,
1-(2'-carboxyphenyl)-3-methyl-5-pyrazolone,
1-(2':6'-dimethylphenyl)-3-methyl-5-pyrazolone,
1-(2'-ethylphenyl)-3-methyl-5-pyrazolone,
2-chloro-4-sulpho-acetoacetanilide,
4-sulpho-acetoacetanilide,
2-chloro-acetoacetanilide,
acetoacetanilide,
acetoacet-o-anisidide,
5-sulpho-acetoacet-o-anisidide,
3-methyl-4-chloro-6-methoxy-acetoacetanilide,
4-chloro-2:5-dimethoxy-acetoacetanilide,
aniline,
m-toluidine,
5-methyl-2-methoxyaniline,
m-chloroaniline,
m-anisidine,
o-anisidine,
2:5-dimethoxyaniline,
1-naphthyl amine-6- and
-7-sulphonic acids,
1-acetylamino- and
1-benzoylamino-8-naphthol-3:6-disulphonic acids,
1-acetylamino- and
1-benzoylamino-8-naphthol-4:6-disulphonic acids,
1-acetylamino- and
1-benzoylamino-8-naphthol-2:4-disulphonic acids,
2-acetylamino- and
2-benzoylamino-8-naphthol-6-sulphonic acids,
2-acetylamino- and
2-benzoylamino-5-naphthol-6-sulphonic acids,
2-acetylamino- and
2-benzoylamino-8-naphthol-3:6-disulphonic acids and
1-acetylamino- and
1-benzoylamino-8-naphthol-4-sulphonic acids.

A further class of suitable compounds for use in the above process may be obtained for example by diazotising an aromatic primary amine (which does not contain a hydroxyl, alkoxy or carboxylic acid group ortho to the amino group), for example aniline-2:5-disulphonic acid, m- and p-nitroaniline, 4-nitroaniline-2-sulphonic acid, 3-nitroaniline-4-sulphonic acid, m- and p-aminoacetanilide, 4-aminoacetanilide-3-sulphonic acid, 3-aminoacetanilide-4-sulphonic acid or 4-amino-2-acetotoluidide-5-sulphonic acid, and coupling the diazonium compound so obtained with a 4-amino-4'-(3-substituted-pyrazol-5-on-1-yl)-stilbene-disulphonic acid, for example 4-amino-4'-(3-carboxypyrazol-5-on-1-yl)-stilbene-2:2'-disulphonic acid or 4-amino-4'(3-methyl-pyrazol-5-on-1-yl)-stilbene - 2:2'-disulphonic acid.

The process of the invention is preferably carried out at a temperature below 10° C. The preferred medium is water, although it may contain water-soluble organic solvents such as acetone or dioxan. If desired, an acid-binding agent, for example sodium carbonate or sodium bicarbonate may be added.

Those new dyestuffs wherein R of the formula stands for a 4-arylazo-3-substituted pyrazolonyl grouping may also be obtained by first reacting a cyanuric halide with a suitable aminostilbenylpyrazolone in equimolecular quantities (as described, for example in United Kingdom specification No. 602,170) and coupling with a diazotised aromatic amine.

Thus, as a further feature of the invention there is provided a process for the manufacture of new azo dyestuffs which comprises diazotising a primary aromatic monoamine which may be substituted other than with an alkylamino group or with, ortho to the amino group, a hydroxyl, carboxylic acid or alkoxy group, and coupling the diazonium compound so obtained with a compound of the formula:

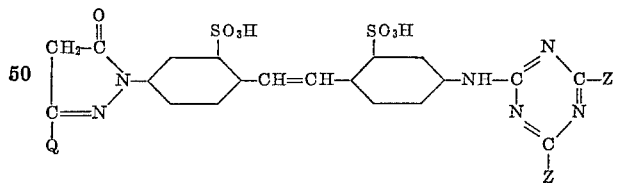

wherein Z stands for a halogen atom and Q stands for an alkyl, aryl, carboxylic acid or carbalkoxy group. During the coupling stage, in order to avoid removal, by hydrolysis, of the halogen atoms attached to the triazine ring it is preferred to carry out the coupling at a temperature below 10° C. in a weakly alkaline to weakly acid medium, preferably at pH not greater than 7.5.

It is generally preferable to isolate the new dyestuffs from the media in which they have been formed at a pH from 6 to 8 and it has been found that the loss of halogen from the triazine rings in the dyestuffs can be reduced considerably by addition of buffering agents which give a pH value between 6 and 8 and in particular by those which give a pH of about 6.5. These buffering agents, for example mixtures of disodium hydrogen phosphate and sodium dihydrogen phosphate or of disodium hydrogen phosphate and potassium dihydrogen phosphate, may be added at any time during the manufacture of the new dyestuffs, but a convenient procedure comprises addition of sufficient acid-binding agent to the reaction mixture to give a pH between 6 and 8, then addition of buffering agent and then salt to precipitate the dyestuff, isolation of the latter by filtration and addition of more buffering agent to the dyestuff paste before drying.

The drying of the dyestuff paste is preferably carried out at a temperature below 65° C.

The dry, buffered dyestuff composition in many cases has greater storage stability than either the moist dyestuff paste or the unbuffered composition.

The new azo dyestuffs, in the form of the alkali metal salts are soluble in water and are preferably used to colour silk, wool, regenerated protein and cellulosic textile materials for example cotton, linen and viscose rayon, by treating the textile material with an aqueous solution (which may be a thickened printing paste) of the dyestuff in conjunction with a treatment with an alkaline agent, for example sodium hydroxide, potassium phosphate, sodium bicarbonate or sodium carbonate. The treatment with the alkaline agent may be carried out prior to, simultaneously with or after the treatment with the dyestuff.

The new dyestuffs may also be applied to silk, wool, regenerated protein, polyamide and modified polyacrylonitrile textile materials, by the conventional dyeing methods used for those textile materials, that is by dyeing from weakly acid or neutral dyestuff solutions, for example dyestuff solutions containing acetic acid, formic acid, sodium sulphate or ammonium acetate.

The dyestuffs may also be applied to silk, wool and regenerated protein textile materials by the conventional printing methods used for those materials.

When so applied they give orange to yellow shades, very fast to washing and fast to light. They are especially valuable for application to cellulosic textile materials from a cold dyebath in the presence of an alkaline agent since an unusually high fixation of dyestuff is obtained on the textile material under such conditions.

Those dyestuffs obtained from 4-nitro-4'-aminostilbene-2:2'-disulphonic acid by diazotising, coupling with an aromatic amine and interacting the product obtained with cyanuric chloride are especially valuable since the shades obtained therefrom on cellulosic textile materials have a good resistance to bleach and show little or no drop in light-fastness when the coloured textile material is subjected to treatments, for example impregnation with a urea-formaldehyde resin, designed to improve its resistance to creasing.

The invention is illustrated but not limited by the following examples in which parts and percentages are by weight:

*Example 1*

29.6 parts of the disodium salt of the aminoazo compound obtained by coupling one molecular proportion of diazotised 4-nitro-4'-aminostilbene-2:2'-disulphonic acid with one molecular proportion of sodium aniline-methane sulphonate and subsequently hydrolysing with dilute alkali, are dissolved in 750 parts of water. 10 parts of cyanuric chloride are dissolved in 200 parts of acetone and the solution is poured on a stirred mixture of 200 parts of ice and 100 parts of water. The solution of the aminoazo dyestuff is added over 40 minutes to the suspension of cyanuric chloride keeping the temperature below 5° C. by the addition of ice if necessary. The mixture is stirred for 45 minutes, then neutralised to delta paper with 35 parts of 10% aqueous sodium carbonate solution. The suspension is buffered by addition of 1.9 parts of disodium hydrogen phosphate and 3.1 parts of potassium dihydrogen phosphate and filtered.

The residue on the filter is slurried in 300 parts of acetone, filtered and the product on the filter is dried at room temperature.

The dyestuff powder so obtained contains 1.9 atoms of organically-bound chlorine for each azo group present. It corresponds substantially to disodium 4-nitro-4'-[4-(4:6-dichloro-s-triazinyl-2-amino)-phenylazo] - stilbene-2:2'-disulphonate, that is, the disodium salt of the compound of Formula I wherein:

R stands for —NO$_2$
X stands for 4'-phenylazo
Y stands for H, and
Z stands for Cl.

When applied to cellulosic fibres by the methods described above it gives yellow shades of excellent fastness to washing and light.

By replacing the aminoazo compound used in the above example by the molecularly equivalent proportion of other aminoazo compounds of Formula II, obtained by coupling a 4-substituted-4'-aminostilbene-2:2'-disulphonic acid with an alkyl arylamine or an arylamine, other valuable dyestuffs are obtained. In the following table, column I shows the 4-substituent represented by R, and column II shows the amine or amine methane sulphonate used as coupling component; the final column shows the shades obtained from these dyestuffs. Where an amine methane sulphonate is used, it is to be understood that the product is hydrolysed to obtain the unsubstituted amino compound.

| R | Coupling Component | Shade |
|---|---|---|
| —NO$_2$ | m-toluidine-ω-methane sulphonate | reddish-yellow. |
| —NO$_2$ | N-methyl aniline | Do. |
| —NO$_2$ | 5-methyl-2-methoxyaniline | orange. |
| —NO$_2$ | 2:5-dimethoxyaniline | Do. |
| —NO$_2$ | orthoanisidine | reddish-yellow. |
| NO$_2$ | m-chloroaniline | Do. |
| NO$_2$ | m-anisidine | orange. |
| NO$_2$ | N-ethylaniline | reddish-yellow. |
| NO$_2$ | N-butylaniline | Do. |
| Cl | N-methylaniline | Do. |
| Br | aniline | Do. |
| Br | N-methylaniline | Do. |
| Br | m-toluidine | Do. |
| —NHCOCH$_3$ | N-methylaniline | Do. |
| —NHCO$_6$H$_5$ | aniline | Do. |
| —NHCOC$_6$H$_5$ | m-toluidine | Do. |
| CH$_3$\N—/CH$_3$ | do | Do. |
| —NO$_2$ | 1-naphthylamine-6-sulphonic acid | orange. |
| —Cl | sodium aniline-ω-methane sulphonate | reddish-yellow. |
| —Cl | sodium m-toluidine-ω-methane sulphonate | Do. |
| —NH.COCH$_3$ | sodium aniline-ω-methane sulphonate | Do. |
| —NH.COCH$_3$ | sodium m-toluidine-ω-methane sulphonate | Do. |

*Example 2*

13.5 parts of the tetrasodium salt of the aminoazo compound obtained by coupling one molecular proportion of diazotised 4-amino-4'-(5-sulpho-2-naphtha(1':2':4:5) triazolyl)-stilbene-2:2'-disulphonic acid with one molecular proportion of 1-naphthylamine-6-sulphonic acid are dissolved in 250 parts of water. 3.5 parts of cyanuric chloride are dissolved in 100 parts of acetone and the solution is poured on a stirred mixture of 200 parts of ice and 100 parts of water. The above solution of aminoazo dyestuff is added over 20 minutes to the suspension of cyanuric chloride keeping the temperature of the mixture below 5° C. The reaction mixture is stirred for 1 hour below 5° C., then neutralised by adding 7 parts of 10% aqueous sodium carbonate solution. The solution is buffered at pH 6.4 by addition of 2.5 parts of disodium hydrogen phosphate and 4.5 parts of potassium dihydrogen phosphate, then 50 parts of sodium chloride are added and the mixture is filtered. The residue on the filter is stirred in 150 parts of acetone, filtered and the residue on the filter is dried at room temperature. The product so obtained contains 1.9 atoms of organically-bound chlorine. It corresponds substantially to the tetrasodium salt of the compound of the formula:

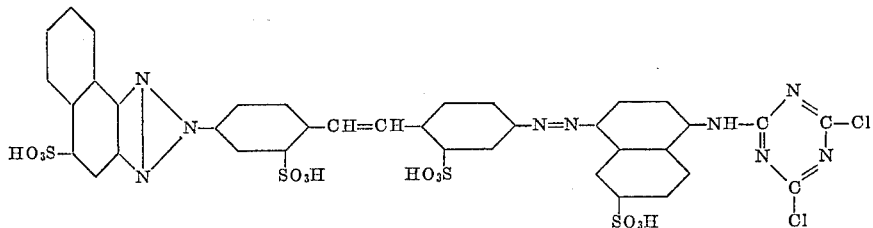

When applied by the methods described above it dyes cellulosic fibres in orange shades of good fastness to washing and light.

Example 3

57.7 parts of the disodium salt of the aminoazo compound obtained by coupling one molecular proportion of diazotised 4-nitro-4'-aminostilbene-2:2'-disulphonic acid with one molecular proportion of phenol, methylating the hydroxy group and reducing the nitro group to amino are dissolved in 150 cc. of water. 18.8 parts of cyanuric chloride are dissolved in 200 parts of acetone and the solution is poured on a stirred mixture of 600 parts of ice and 400 parts of water. The above solution of aminoazo compound is added to the suspension of cyanuric chloride during 30 minutes keeping the temperature below 5° C. by external cooling. The mixture is stirred for 20 minutes then neutralised with 25 parts of 10% aqueous sodium carbonate solution. The mixture is buffered at pH 6.4 by addition of 3.5 parts of disodium hydrogen phosphate and 6.25 parts of potassium dihydrogen phosphate, then 80 parts of sodium chloride are added and the mixture is filtered and the residue on the filter is dried.

The product so obtained contains 2.2 atoms of chlorine for each azo group present. It corresponds substantially to disodium 4 - (4:6-dichloro-s-triazinyl-2-amino)-4'-(4-methoxyphenylazo)-stilbene-2:2'-disulphonate. It dissolves readily in water and, when applied by the methods described above dyes cellulosic fibres in greenish-yellow shades of excellent fastness to washing and light.

By replacing the methylated phenol residue in the above example by a 2-naphthol-3:6-disulphonic acid residue or by a 1-naphthol-3:6:8-trisulphonic acid residue there are obtained dyestuffs which, when applied by the methods described above, dye cellulosic fibres in violet shades of good fastness to washing and light.

Example 4

29.8 parts of the tetrasodium salt of the aminoazo compound obtained by coupling one molecular proportion of diazotised aniline-2:5-disulphonic acid with one molecular proportion of 4 - amino-4'-(3-methylpyrazol-5-on-1-yl)-stilbene-2:2'-disulphonic acid are dissolved in 200 parts of water. 6.3 parts of cyanuric chloride are dissolved in 100 parts of acetone and the solution is poured on a stirred mixture of 200 parts of ice and 200 parts of water. The above solution of aminoazo compound is added during 40 minutes to the cyanuric chloride suspension keeping the temperature below 5° C. The mixture is stirred for 1 hour, then neutralized by adding 17.5 parts of 10% aqueous sodium carbonate solution. The mixture is buffered at pH 6.4, by adding 3.6 parts of disodium hydrogen phosphate and 6.4 parts of potassium dihydrogen phosphate, 50 parts of ammonium sulphate are added, and the mixture is filtered and the residue on the filter is dried. The product so obtained contains 2 atoms of chlorine for each azo group and corresponds substantially to the tetrasodium salt of the compound of the formula:

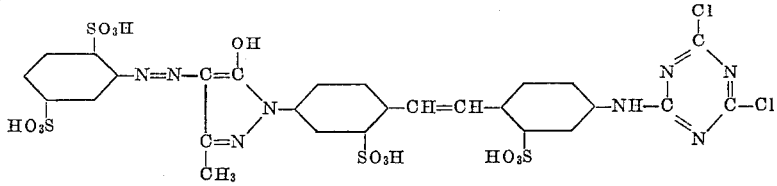

It dissolves readily in water and when applied by the methods described above dyes cellulosic fibres in yellow shades of excellent fastness to washing and light.

By replacing the aminoazo compound obtained from diazotised aniline-2:5-disulphonic acid by the corresponding compounds obtained from diazotised sulphanilic acid or diazotised orthanilic acid dyestuffs are obtained which also colour cellulosic fibres in yellow shades of good fastness to washing and light, when applied by the methods described above.

The aminoazo compounds obtained from 2-amino-5-sulphobenzoic acid, 2-amino-4-sulphobenzoic acid, 2-naphthylamine-4:8-disulphonic acid and 2-naphthylamine-3:6:8-trisulphonic acid as diazo components all give rise to yellow dyestuffs similar to that described above.

An orange dyestuff is obtained if, in the above example, there is used, in place of the aminoazo compound, the disazo compound obtained by coupling diazotised 2-naphthylamine-4:8-disulphonic acid with m-toluidine, diazotising this monoazo compound and coupling the diazonium compound obtained with 4-amino-4'-(3-methylpyrazol-5-on-1-yl)stilbene-2:2'-disulphonic acid.

The following method may also be used to obtain the dyestuff of the above formula:

3.7 parts of cyanuric chloride are dissolved in 40 parts of acetone and the solution is poured into a mixture of 50 parts of ice and 50 parts of water. A neutral solution of 9.02 parts of 4-amino-4'-(3'-methylpyrazol-5-on-1-yl)stilbene-2:2'-disulphonic acid in 200 parts of water is added during 30 minutes at a temperature below 3° C., the pH of the mixture being kept at about 6.4 by the slow addition of 10% aqueous sodium carbonate solution.

The mixture is stirred for 4 hours, then a solution of the diazo compound from aniline-2:5-disulphonic acid is added. 6 parts of sodium acetate are added and the mixture is stirred at a temperature below 5° C. for 10 hours. Sodium carbonate is then added until the pH is 6.8 and the mixture is stirred for 10 hours.

The mixture is buffered at pH 6.4 as described above, then sodium chloride is added at the rate of 150 grams per litre of mixture. The precipitated dyestuff is filtered off, washed with acetone and dried.

Example 5

If, in the process described in Example 1, the cyanuric chloride is replaced by 17.5 parts of cyanuric bromide, there is obtained a reddish-yellow dyestuff having similar properties.

The dyestuff obtained by interaction of equimolecular quantities of cyanuric bromide and the aminoazo compound obtained by coupling diazotised 4-nitro-4'-aminostilbene-2:2'-disulphonic acid with m-toluidine-omega-methane sulphonate and hydrolysing, also gives reddish-yellow shades of excellent fastness to light and to washing.

Example 6

If, in the process described in Example 2, the aminoazo compound used is replaced by either:

(1) The aminoazo compound obtained by coupling diazotized 4-amino-4'-(5-sulpho-2-naphtha(1':2':4:5)triazolyl)stilbene-2:2'-disulphonic acid with aniline, or (2) The aminoazo compound obtained by coupling diazotised 4-amino-4'-(7-sulpho-2-naphtha(1':2':4:5)triazolyl)stilbene-2:2'-disulphonic acid with m-toluidine, a dyestuff giving reddish yellow shades of good fastness to washing and light is obtained.

Example 7

In the following table are described the shades obtained from other dyestuffs of the invention obtained substantially as described in Example 3 by coupling diazotised 4-nitro-4'-aminostilbene-2:2'-disulphonic acid with

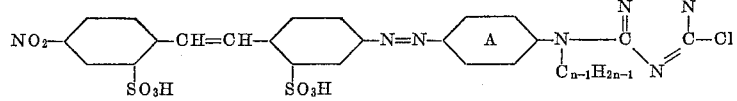

the coupling component named in the first column, reducing the resultant nitro-azo compound to convert the nitro group to amino and condensing the aminoazo compound so obtained with 1 molecular proportion of cyanuric chloride.

| Coupling Component | Shade |
| --- | --- |
| 1-acetylamino-8-naphthol-3:6-disulphonic acid | violet. |
| 1-phenylamino-8-naphthol-3:6-disulphonic acid | navy blue. |
| acetoacetanilide | greenish yellow. |
| 1-phenyl-3-methyl-5-pyrazolone | Do. |
| 1-(4'-sulphophenyl)-3-methyl-5-pyrazolone | Do. |

Example 8

If, in the process described in Example 3, there is used the aminoazo compound obtained by coupling diazotised 4-nitro-4'-aminostilbene-2:2'-disulphonic acid with phenol, ethylating the hydroxy group and reducing to convert the nitro group to amino, a dyestuff is obtained giving greenish-yellow shades on cellulose of good fastness to washing and to light.

Example 9

57.7 parts of the disodium salt of the aminoazo compound used in Example 3 are diazotised and the resulting diazonium compound is coupled with 1-naphthylamine-7-sulphonic acid. The amino-disazo compound so obtained is then condensed with 18.8 parts of cyanuric chloride under similar conditions to those used in Example 3.

The dyestuff obtained colours cellulose in orange shades fast to washing and to light.

What I claim is:

1. Dyestuffs, which, in the free acid form, have the formula:

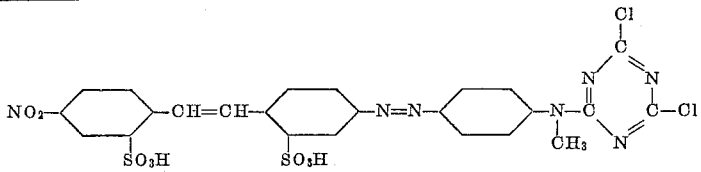

wherein $n$ stands for a positive integer up to 2 and the phenyl ring A is selected from the group consisting of unsubstituted phenylene, phenylene substituted by a lower alkyl radical, phenylene substituted by from 1 to 2 lower alkoxy radicals, and phenylene substituted by a lower alkyl and a lower alkoxy radical.

2. The dystuff, which, in the free acid form, has the formula:

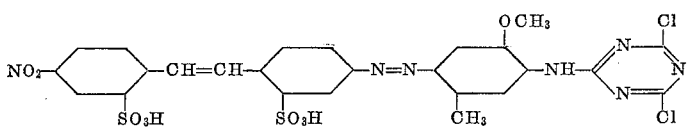

3. The dyestuff which, in the free acid form, has the formula:

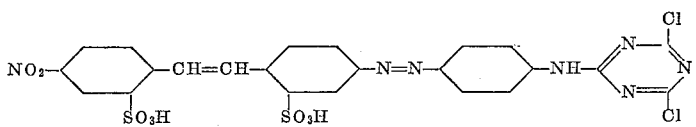

4. The dyestuff which, in the free acid form, has the formula:

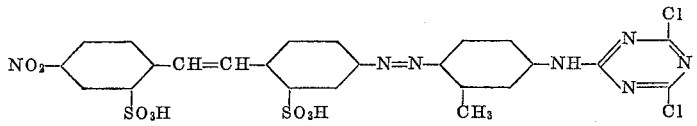

5. The dyestuff which, in the free acid form, has the formula:

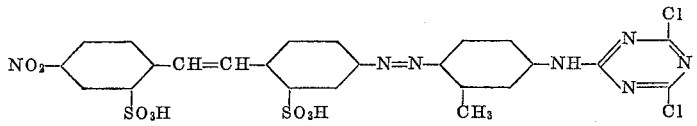

References Cited in the file of this patent

UNITED STATES PATENTS

| | | |
| --- | --- | --- |
| 1,667,312 | Fritzsche et al. | Apr. 24, 1928 |
| 2,270,478 | Schmid | Jan. 20, 1942 |
| 2,741,655 | Riat et al. | Apr. 10, 1956 |
| 2,795,578 | Feeman | June 11, 1957 |
| 2,824,093 | Benz et al. | Feb. 18, 1958 |